(12) United States Patent
Pearce et al.

(10) Patent No.: US 7,451,527 B2
(45) Date of Patent: Nov. 18, 2008

(54) ROPE TERMINATOR

(75) Inventors: Colin Richard Pearce, Cleveland (GB); Justin Nicolas Farrelly, Darlington (GB)

(73) Assignee: Colt Systems Limited (GB)

( * ) Notice: Subject to any disclaimer, the term of this patent is extended or adjusted under 35 U.S.C. 154(b) by 239 days.

(21) Appl. No.: 10/560,202

(22) PCT Filed: Jun. 14, 2004

(86) PCT No.: PCT/GB2004/002571

§ 371 (c)(1),
(2), (4) Date: Apr. 18, 2006

(87) PCT Pub. No.: WO2004/113760

PCT Pub. Date: Dec. 29, 2004

(65) Prior Publication Data

US 2006/0179619 A1    Aug. 17, 2006

(30) Foreign Application Priority Data

Jun. 14, 2003    (GB) .................................. 0313880.7

(51) Int. Cl.
*F16G 11/05* (2006.01)

(52) U.S. Cl. ..................... 24/122.6; 24/136 L

(58) Field of Classification Search ....................... None
See application file for complete search history.

(56) References Cited

U.S. PATENT DOCUMENTS

| | | | | | |
|---|---|---|---|---|---|
| 3,333,310 | A | * | 8/1967 | Lagarde et al. | 24/265 EE |
| 3,596,330 | A | * | 8/1971 | Scott et al. | 24/122.3 |
| 4,509,233 | A | * | 4/1985 | Shaw | 24/136 R |
| 5,018,251 | A | * | 5/1991 | Brown | 24/122.6 |
| 5,351,366 | A | * | 10/1994 | Shaw | 24/122.6 |

* cited by examiner

*Primary Examiner*—Jack W. Lavinder
(74) *Attorney, Agent, or Firm*—Andrus, Sceales, Starke & Sawall, LLP

(57) ABSTRACT

A rope terminator comprising, an elongate hollow barrel (12) formed from a fiber reinforced synthetic resin material, the barrel having therein a rope receiving passage (13), and said passage having a first end region from which the rope (18) to be terminated extends in use, and an opposite, second end region, the passage tapering in internal diameter from a minimum at said first end region to a maximum at said second end region, a tapering wedge member (14) for insertion into said passage of the barrel to trap fibers (19) of the rope (18) between the outer tapering surface of the wedge member and the inner tapering surface of said passage, said barrel having an outer surface region tapering in diameter. The terminator further includes a hollow outer body member (11) having therein a tapering passage within which said outer tapering surface of said barrel is received, providing a means (15b) of attaching the terminated rope to an anchor point.

14 Claims, 10 Drawing Sheets

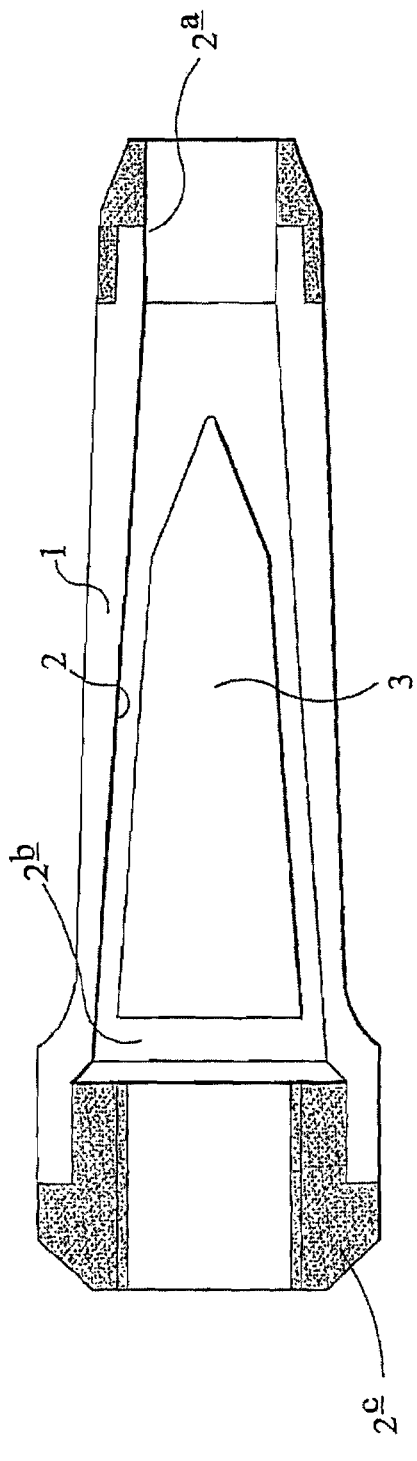
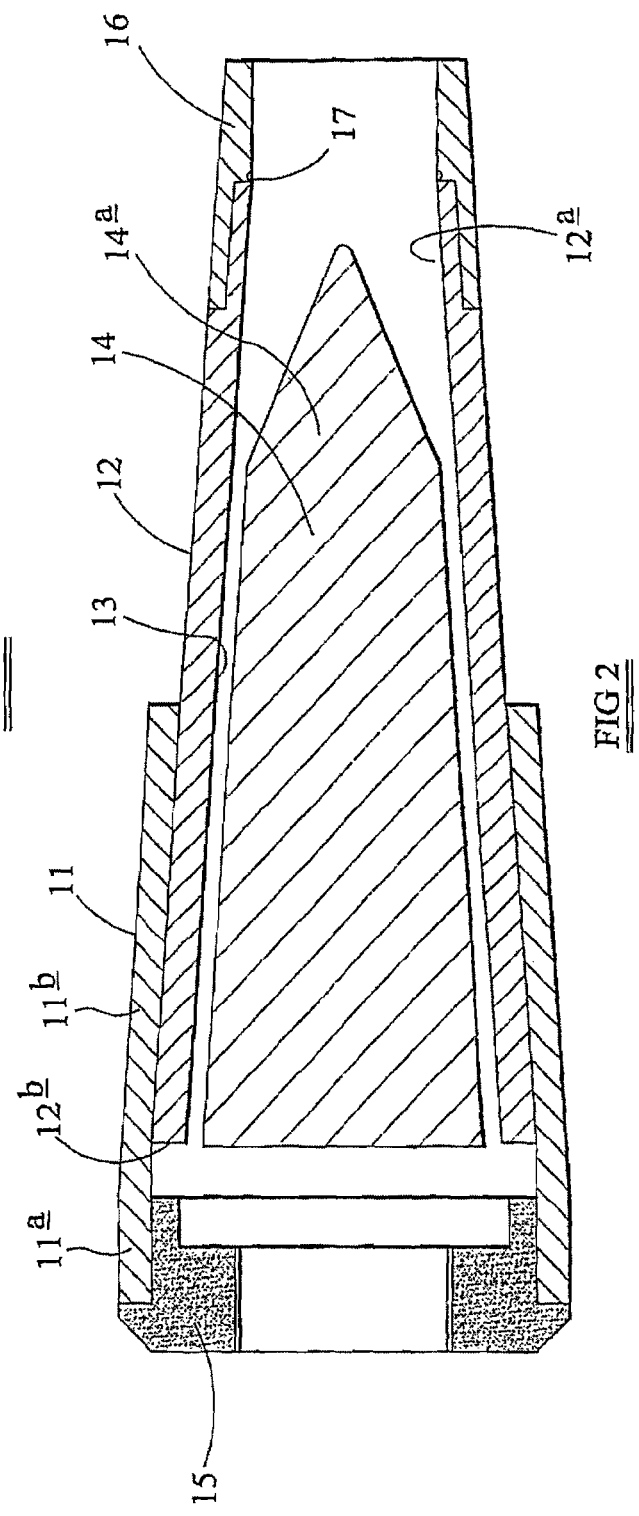
FIG 1 - PRIOR ART
FIG 2

Zylon™ ropes Body Summary
| size | Q Small End I.D. | H Large End I.D. | T wall thickness | M mating length | L total length |
|---|---|---|---|---|---|
| 8.0 | 16.59 | 21.64 | 1.79 | 38.00 | 48.08 |
| 10.0 | 18.49 | 23.93 | 2.00 | 41.00 | 52.28 |
| 12.0 | 20.39 | 26.10 | 2.19 | 43.00 | 55.35 |
| 15.0 | 23.47 | 29.31 | 2.45 | 44.00 | 57.81 |
| 22.5 | 29.00 | 35.38 | 3.00 | 48.00 | 64.91 |
| 25.0 | 30.48 | 36.59 | 3.16 | 46.00 | 63.83 |
| 30.0 | 33.96 | 41.27 | 3.46 | 55.00 | 74.53 |
| 45.0 | 40.93 | 49.96 | 4.24 | 68.00 | 91.92 |
| 54.0 | 44.87 | 54.83 | 4.65 | 75.00 | 101.20 |
| 60.0 | 46.83 | 57.32 | 4.90 | 79.00 | 106.62 |
| 90.0 | 58.34 | 71.09 | 6.00 | 96.00 | 129.83 |
| 120.0 | 67.18 | 81.93 | 6.93 | 111.00 | 150.06 |
| 270.0 | 100.54 | 122.59 | 10.39 | 166.00 | 224.59 |
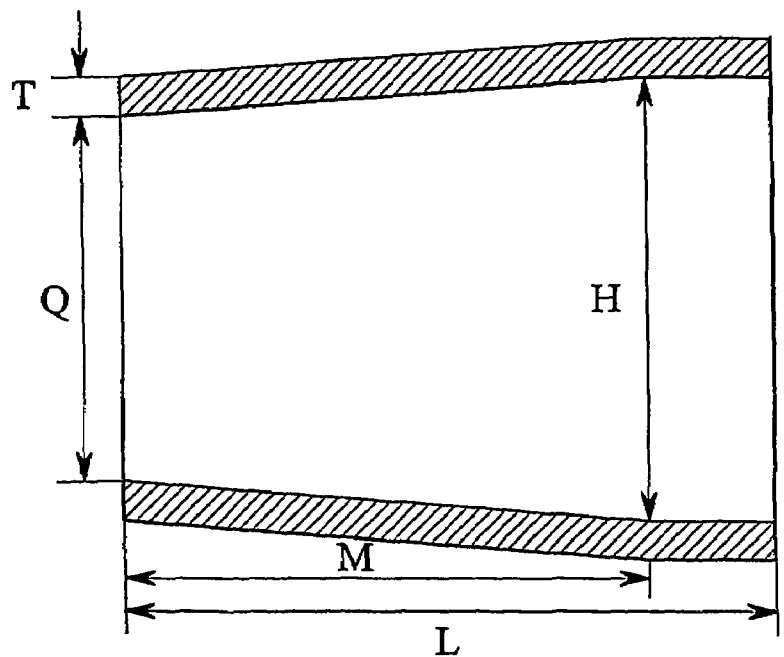
Table 1

| Zylon™ Ropes | Barrel summary | | | | |
|---|---|---|---|---|---|
| | U | A | G | F | |
| size | length | Small I.D. | Large I.D. | Wall Thickness | Winding Angle |
| 8.0 | 63.00 | 8.80 | 17.17 | 2.24 | 67° |
| 10.0 | 71.00 | 9.50 | 18.93 | 2.50 | 66° |
| 12.0 | 80.00 | 10.00 | 20.63 | 2.74 | 65° |
| 15.0 | 88.00 | 11.50 | 23.19 | 3.06 | 65° |
| 22.5 | 112.00 | 13.00 | 27.88 | 3.75 | 63° |
| 25.0 | 113.00 | 15.00 | 28.68 | 3.95 | 63° |
| 30.0 | 125.00 | 16.00 | 32.60 | 4.33 | 61° |
| 45.0 | 157.00 | 18.50 | 39.36 | 5.30 | 60° |
| 54.0 | 171.00 | 20.50 | 43.22 | 5.81 | 60° |
| 60.0 | 185.00 | 20.50 | 45.08 | 6.12 | 61° |
| 90.0 | 219.00 | 27.00 | 56.09 | 7.50 | 63° |
| 120.0 | 253.00 | 31.00 | 64.61 | 8.66 | 63° |
| 270.0 | 381.00 | 46.00 | 96.6 | 12.99 | 63° |
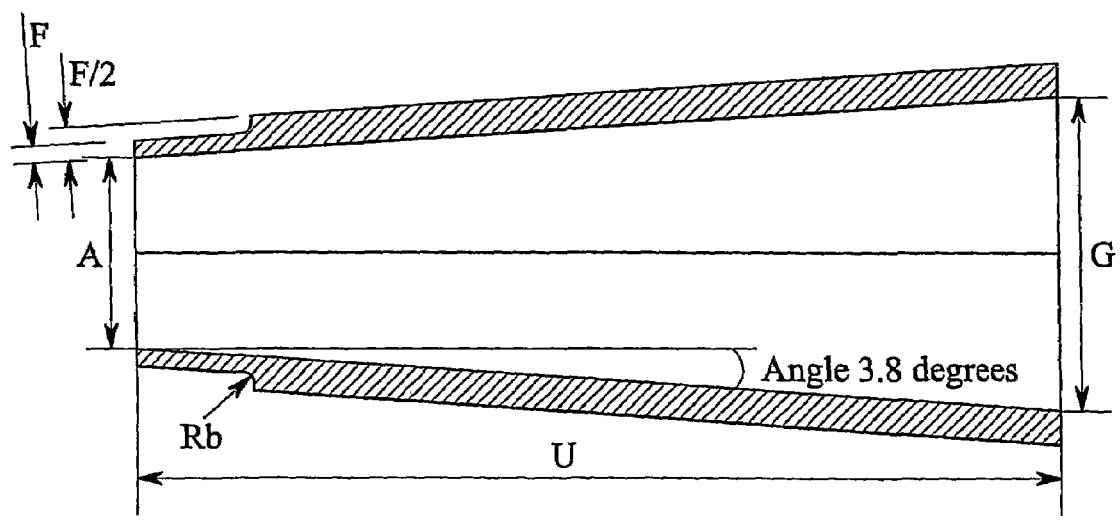
Table 2

Zylon™ ropes     Spike Summary
| size | Sc<br>Total Length | Sd<br>Effective Length | Sb<br>Large O.D | Sa<br>Small O.D. |
|---|---|---|---|---|
| 8.0 | 59.850 | 44.888 | 16.516 | 10.142 |
| 10.0 | 67.450 | 50.588 | 18.191 | 11.007 |
| 12.0 | 76.000 | 57.000 | 19.811 | 11.717 |
| 15.0 | 83.600 | 62.700 | 22.283 | 13.379 |
| 22.5 | 106.400 | 79.800 | 26.745 | 15.414 |
| 25.0 | 97.850 | 73.388 | 27.458 | 17.037 |
| 30.0 | 118.750 | 89.063 | 31.314 | 18.667 |
| 45.0 | 149.150 | 111.863 | 37.751 | 21.866 |
| 54.0 | 162.450 | 121.838 | 41.462 | 24.161 |
| 60.0 | 175.750 | 131.813 | 43.206 | 24.489 |
| 90.0 | 208.050 | 156.038 | 53.841 | 31.683 |
| 120.0 | 240.350 | 180.263 | 62.002 | 36.405 |
| 270.0 | 361.950 | 271.463 | 92.690 | 54.142 |
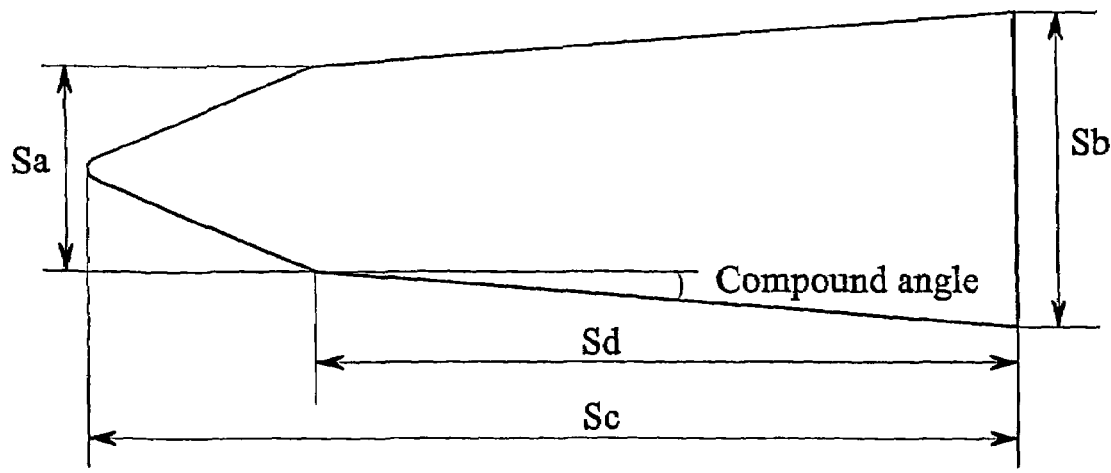
Table 3

Aramid ropes — Body Summary
| size | Q Small End I.D. | H Large End I.D. | T Wall Thickness | M Mating Length | L Total Length |
|---|---|---|---|---|---|
| 8.0 | 18.39 | 23.18 | 1.79 | 36.00 | 45.17 |
| 10.0 | 20.95 | 26.00 | 2.00 | 38.00 | 48.25 |
| 12.0 | 23.23 | 28.41 | 2.19 | 39.00 | 50.23 |
| 15.0 | 26.67 | 31.99 | 2.45 | 40.00 | 52.55 |
| 22.5 | 32.67 | 38.52 | 3.00 | 44.00 | 59.38 |
| 25.0 | 34.48 | 40.59 | 3.16 | 46.00 | 62.21 |
| 30.0 | 38.13 | 44.77 | 3.46 | 50.00 | 67.75 |
| 45.0 | 47.67 | 55.64 | 4.24 | 60.00 | 81.74 |
| 54.0 | 52.11 | 60.88 | 4.65 | 66.00 | 89.82 |
| 60.0 | 54.54 | 63.84 | 4.90 | 70.00 | 95.11 |
| 90.0 | 64.01 | 75.83 | 6.00 | 89.00 | 119.75 |
| 120.0 | 74.46 | 88.01 | 6.93 | 102.00 | 137.51 |
| 270.0 | 115.76 | 135.42 | 10.39 | 148.00 | 201.26 |
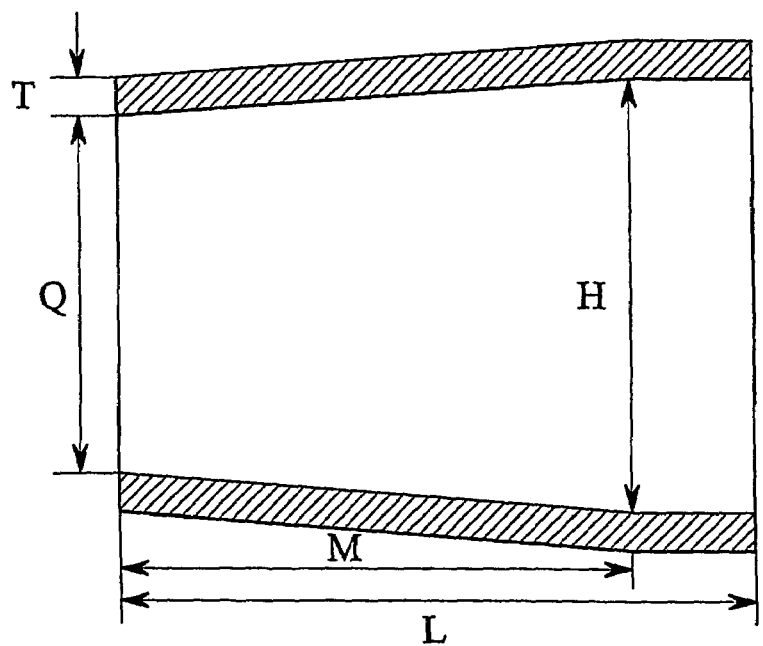
Table 4

| Aramid Ropes size | Barrel summary U length | A Small End I.D. | G Large End I.D. | F Wall Thickness | Winding Angle |
|---|---|---|---|---|---|
| 8.0 | 58.00 | 11.00 | 18.70 | 2.24 | 67° |
| 10.0 | 64.00 | 12.50 | 21.00 | 2.50 | 67° |
| 12.0 | 71.00 | 13.50 | 22.93 | 2.74 | 66° |
| 15.0 | 78.00 | 15.50 | 25.86 | 3.06 | 65° |
| 22.5 | 98.00 | 18.00 | 31.02 | 3.75 | 64° |
| 25.0 | 103.00 | 19.00 | 32.68 | 3.95 | 63° |
| 30.0 | 110.00 | 21.50 | 36.11 | 4.33 | 63° |
| 45.0 | 132.00 | 27.50 | 45.03 | 5.30 | 60° |
| 54.0 | 145.00 | 30.00 | 49.26 | 5.81 | 60° |
| 60.0 | 155.00 | 31.00 | 51.59 | 6.12 | 60° |
| 90.0 | 202.00 | 34.00 | 60.83 | 7.50 | 62° |
| 120.0 | 231.00 | 40.00 | 70.69 | 8.66 | 63° |
| 270.0 | 327.00 | 66.00 | 109.44 | 12.99 | 63° |
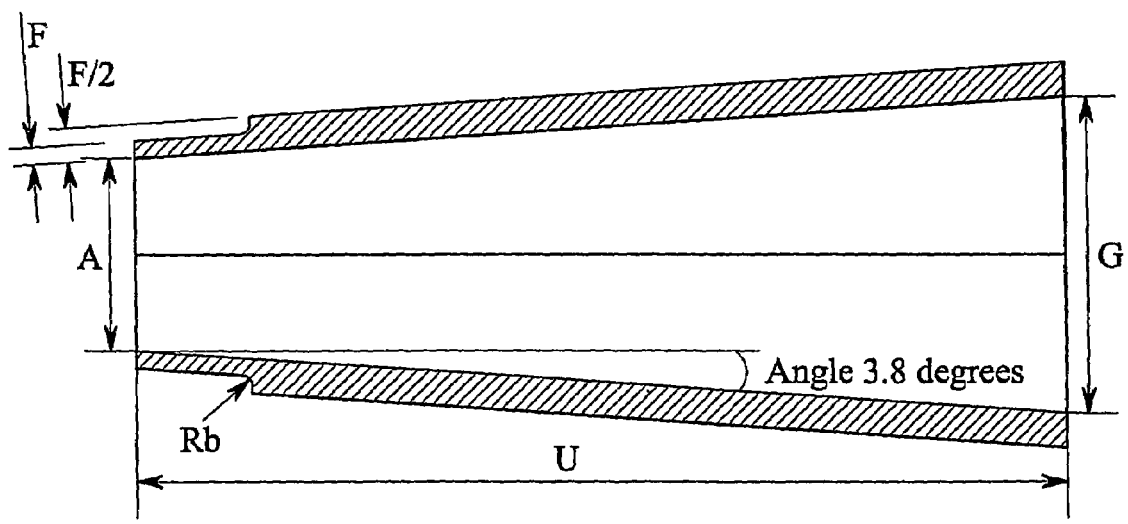
Table 5

| Aramid ropes | | Spike Summary | | |
| --- | --- | --- | --- | --- |
| | Sc | Sd | Sb | Sa |
| size | Total Length | Effective Length | Large End O.D. | Small End O.D. |
| 8.0 | 55.100 | 41.325 | 17.489 | 11.621 |
| 10.0 | 60.800 | 45.600 | 19.649 | 13.174 |
| 12.0 | 67.450 | 50.588 | 21.444 | 14.261 |
| 15.0 | 74.100 | 55.575 | 24.214 | 16.322 |
| 22.5 | 93.100 | 69.825 | 28.955 | 19.040 |
| 25.0 | 97.850 | 73.388 | 30.506 | 20.085 |
| 30.0 | 104.500 | 78.375 | 33.751 | 22.621 |
| 45.0 | 125.400 | 94.050 | 42.198 | 28.843 |
| 54.0 | 137.750 | 103.313 | 46.149 | 31.479 |
| 60.0 | 147.250 | 110.438 | 48.286 | 32.604 |
| 90.0 | 191.900 | 143.925 | 56.619 | 36.182 |
| 120.0 | 219.450 | 164.588 | 65.852 | 42.481 |
| 270.0 | 310.650 | 232.988 | 102.430 | 69.345 |
Table-6
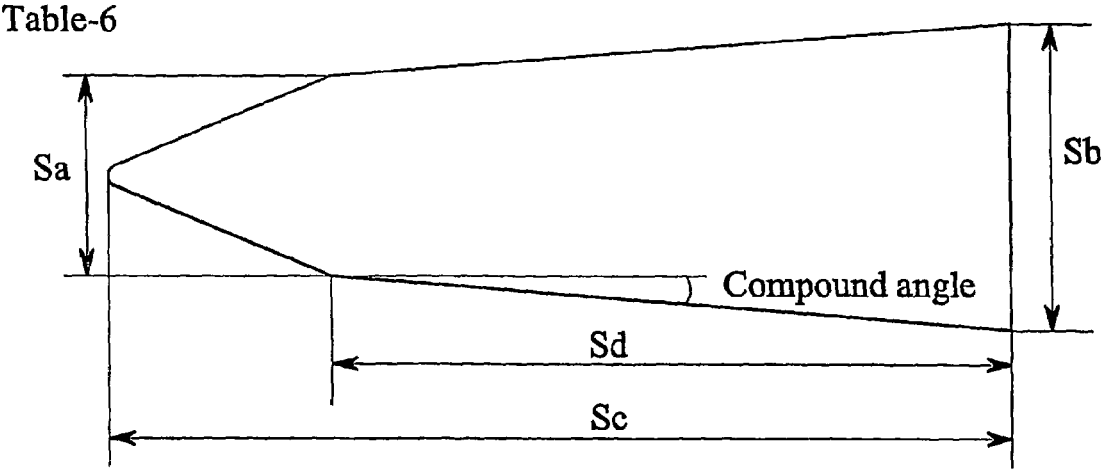
Table 6

ROPE TERMINATOR

TECHNICAL FIELD

This invention relates to a rope terminator for use with high strength, low stretch, parallel core synthetic ropes.

BACKGROUND ART

Rope terminators are sometimes referred to as "Rope Fittings" and are attached to an end of a rope to provide a means for securing the rope end to an anchor point. The rope terminator of the present invention is particularly intended for use with parallel core ropes formed from high strength, low stretch synthetic fibres for example Aramid fibres, a particular example being Kevlar™, and those consisting of parallel PBO (p-phenylylene-2'6-benzobisoxazole) fibres, an example of which is Zylon™.

The term "parallel core" in relation to ropes indicates that the fibres of the rope extend parallel to one another as a "hank" of fibres usually restrained between their ends by an outer sheath or binding. However in so far as the terminator is concerned the fibres need to be parallel only in the immediate proximity of the terminator and so it is to be understood that ropes where the fibres are wound or even braided can be used with the terminator provided that the fibres at the terminator end region of the rope are arranged generally parallel to one another. Moreover while a terminator in accordance with the present invention is intended for use with Aramid or PBO fibre ropes, it can be used with ropes formed from fibres of other materials.

A conventional rope termination is illustrated in British Patent 1341013 and in FIG. 1 of the accompanying drawings. A tapering wedge member or spike 3 traps fibres of the rope 9 against the inner surface of an internally tapering metal body 1. As the tension in the rope increases the wedging action between the wedge member, the fibres, and the barrel increases as the wedge member is drawn deeper into the tapering barrel. The arrangement illustrated in FIG. 1 and British Patent 1341013 is suitable for terminating steel strand ropes, natural fibre ropes, and ropes constructed from certain synthetic fibres.

High strength, low stretch fibres are used for ropes in applications where high strength and/or low stretch combined with low weight is critical. They are typically used in applications where steel rod or steel wire would conventionally be used but are deemed too heavy, including by way of example any high performance sporting equipment where weight reduction is generally of prime concern, of which yacht rigging is a prime example. Although rope terminators in accordance with the present invention can find use in a wide variety of applications, consideration of the yachting industry will explain the trend towards increased use of modern high strength, low stretch fibre rope materials such as Aramid and PBO materials. Over the past few years the use of steel for deck hardware (pulleys, winches, furling systems and the like) has been replaced by composite materials, such as carbon fibre reinforced plastics materials. Masts and spars, conventionally formed from aluminium, are now increasingly formed from carbon reinforced synthetic resin materials.

The yacht designer's aim is to reduce not simply the overall weight of the yacht, but also to reduce the proportion of the weight of the yacht which is disposed above the yacht centre of gravity. As a simplified example, consider a 20 metre yacht with a 25 metre mast rigged for racing will probably use steel strand ropes or steel rod for its standing rigging, the ropes being terminated with terminators of the kind shown in British Patent 1341013 also formed from steel. Such standing rigging will have a weight of approximately 1.4 kg/m. Approximately 100 metres of the such rigging will be required and if the steel standing rigging could be replaced with a PBO rope of the same strength then the weight of the standing rigging would be reduced from approximately 1.4 kg/m to less than 0.2 kg/m. There would thus be a weight saving of over 100 kg and in the case of standing rigging then the weight of the standing rigging can be considered to be nominally located half way up the height of the mast (12.5 m) and at this height the turning moment of a 100 kg weight is very significant in the handling of the yacht. Furthermore, any reduction in weight in the standing rigging allows approximately a five fold reduction in the counter balancing keel weight and thus it can be seen that by replacing steel standing rigging with PBO fibre rigging an overall weight reduction of 600 kg could be achieved. The PBO ropes will have a cross-sectional area approaching half that of an equivalent modulus steel rope/rod, and consequently the aerodynamic drag or windage presented by PBO ropes will be the same. However, to achieve the same modulus as steel rod, the PBO rope will use more fibre than would be required for strength parity, therefore the PBO rope will have a Nominal Breaking Load (NBL) approximately 40% higher than its equivalent modulus steel rod comparison.

In addition to the performance increase attributable to simply reducing the overall weight of the yacht there would be performance and safety improvements in relation to the responsiveness of the yacht given the lower centre of gravity, reduced draft of the hull, and "tighter" rig. As PBO ropes have the same elastic modulus (and therefore the same stretch) as steel, combined with a reduction in weight of 85% compared to steel, they would form excellent replacements to steel ropes/steel rods in standing rigging where minimising lateral mast movement is critical. However this is not generally possible as the use of a conventional terminator of the kind shown in FIG. 1 and British Patent 1341013 is highly problematic in relation to PBO fibre ropes and consequently PBO is generally not used in conventional standing rigging. The present invention, configured for PBO ropes, permits PBO based ropes to be used in such situations. Although Aramid ropes can be terminated with conventional terminators of the kind shown in FIG. 1 and British Patent 1341013 Aramid ropes are not generally used in shrouds and lateral mast support as they have a lower elastic modulus (and therefore higher stretch) than steel which would induce performance handicaps and instability in the rig. However Aramid ropes are used in the fore and aft plane of the yacht (for example as checkstays and running backstays) where stretch is not as critical but a reduction in weight aloft remains desirable. In these instances where reduction in weight is the prime driver, use of the present invention would offer further weight savings of up to 50% in terminator/fixture weight. Or if PBO cored ropes are used in place of Aramid ropes, an overall weight saving of 50% of assembled rope or 'stay' and a reduction in the 'windage' would be obtained.

As mentioned above the invention can find use in a variety of different environments where Aramid and/or PBO fibre ropes are or could be used and the invention may enable such ropes to be utilized in applications where their use is desirable but currently difficult or impossible owing to the lack of satisfactory terminations. A non-exhaustive list of possible applications for the invention includes Bridge stays, Antennae supports, Lightweight and temporary building structures, Glass walls/ceilings, Suspended electrical systems, Overhead electrically driven tram & train systems, Offshore mooring systems for example Floating Production, Storage & Offloading (FPSO) vessels, and Mobile Drilling Units (MDU).

It is found that both Aramid, and even more so, PBO fibres exhibit their optimum tensile strength while the fibres are maintained as close to a straight configuration as possible. It has been recognised by the present Inventor that fibres have a Fibre Failure Angle (FFA) when under tensile stress, beyond which the fibres should not be bent if optimum tensile strength characteristics of the fibres are to be maintained. It will be recognised that fibres within a terminator bend in a "soft" manner at the point at which they exit the sheath of the rope (the sheath can expand as the fibres are put in tension so that the bend is spread over a radiused finite distance) and again in a "hard" fixed manner at the point where they begin to be gripped between the wedge member and the barrel of the terminator. Both of these bend angles are largely determined by the internal cone angle of the barrel of the terminator. Fibres such as Aramid and PBO have a relatively small FFA and so the cone angle of the barrel of the terminator should be correspondingly small. However, there is a minimum length of fibre which must be gripped between the barrel and the wedge member to prevent terminator failure through fibre slippage and this length increases as the cone angle of the barrel decreases. This, coupled with increasing rope diameters, for larger load capacities, means that the terminator barrel becomes quite large, and when formed in steel carries with it a significant weight penalty.

Furthermore, the inner surface of the barrel is required to have a high surface finish so as to exhibit a lower frictional grip against the fibres than that exhibited between the fibres and the wedge member. As the size of the barrel increases and the cone angle decreases, the difficulty of producing an appropriate surface finish on the interior of the barrel also increases to the point at which it is at best economically non-viable, and at worst impossible, to produce a satisfactory steel barrel for a PBO rope terminator.

It is an object of the present invention to provide a rope terminator which is suitable, in particular, for terminating Aramid and PBO fibre ropes.

DISCLOSURE OF THE INVENTION

In accordance with one aspect of the present invention there is provided a rope terminator comprising, an elongate hollow barrel formed from a fibre reinforced synthetic resin material, the barrel having therein a rope receiving passage, and said passage having a first end region from which the rope to be terminated extends in use, and an opposite, second end region, the passage tapering in internal diameter from a minimum at said first end region to a maximum at said second end region, a tapering wedge member for insertion into said passage of the barrel to trap fibres of the rope between the outer tapering surface of the wedge member and the inner tapering surface of said passage, the wall of said passage and the surface of the said wedge member being such that the frictional drag of the rope fibres on the wall of said passage is less than the frictional drag of the fibres on the surface of the wedge member when the wedge member traps fibres against the wall of the passage, said barrel having an outer surface region overlying a wider end region of said passage, said outer surface region of said barrel tapering in diameter in the same direction as the direction of taper of said region of said passage which it overlies, and, the terminator further including a hollow outer body member having therein a tapering passage within which said outer tapering surface region of said barrel is received, whereby said outer body member encases said outer surface region of said barrel and supports that region of the barrel against bursting loads imposed thereon by the action of said wedge member trapping rope fibres against the wall of said wider end region of said passage, and provides a means of attaching the terminated rope to an anchor point or the like in use.

Preferably the barrel is adhesively bounded to the inner surface of the body.

Preferably said outer body member is formed from steel or similar high tensile strength machineable material.

Desirably said outer body member is arranged releasable to receive a plurality of alternative anchorage components.

Preferably the fibre reinforcement of the material of the barrel is provided by one or more wound PBO fibres.

Preferably the fibre reinforcement of the material of the barrel is provided by one or more wound Aramid fibres.

Preferably the taper angle of the wedge member varies along the length of the wedge member such that throughout the length of the wedge member the area of the annulus defined between the outer surface of the wedge member and the inner surface of the passage is constant.

Desirably the end region of the barrel through which the rope enters the barrel in use is lined by a sleeve member which spaces the rope from the end of the barrel.

Conveniently a separately formed cover overlies the length of said barrel which protrudes from said body.

Preferably the terminator includes mechanical overload indicator means.

Desirably said indicator means includes extrusion of the barrel from the body when the loading, applied in use to an assembly of terminator and rope exceeds a predetermined value.

Preferably at least two axially discrete surface regions of the exterior of said wedge member have different coefficient of friction.

Preferably the material of the fibre reinforcement of the barrel is the same as or similar to the fibre material of the rope with which the terminator is to be used.

BRIEF DESCRIPTION OF THE DRAWINGS

In the accompanying drawings:

FIG. 1 is a diagrammatic cross sectional view of a conventional rope terminator generally of the kind disclosed in British Patent 1341013;

FIG. 2 is a view similar to FIG. 1 of a rope terminator in accordance with one example of the present invention;

Figure 6:
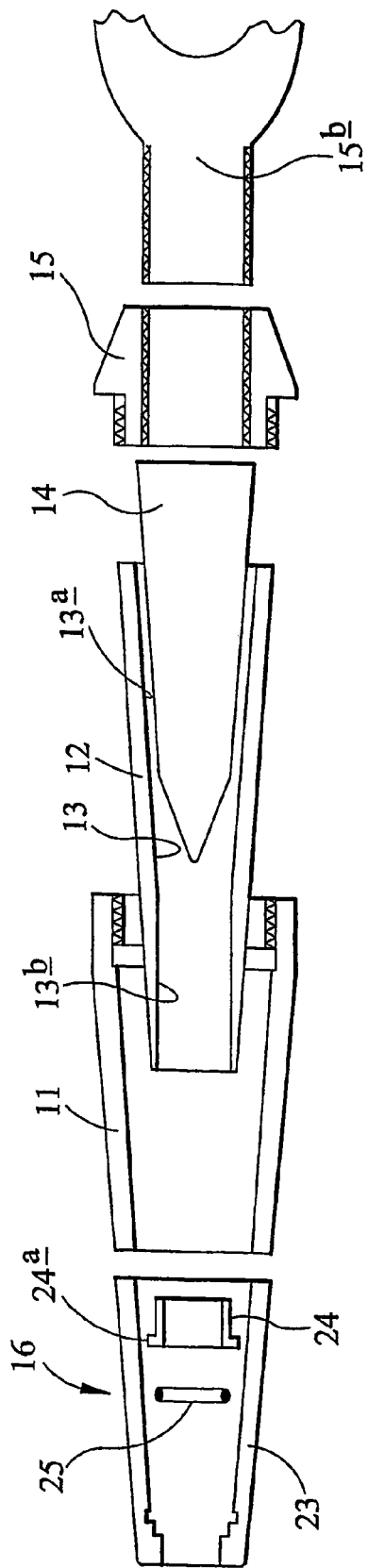
Figure 7:
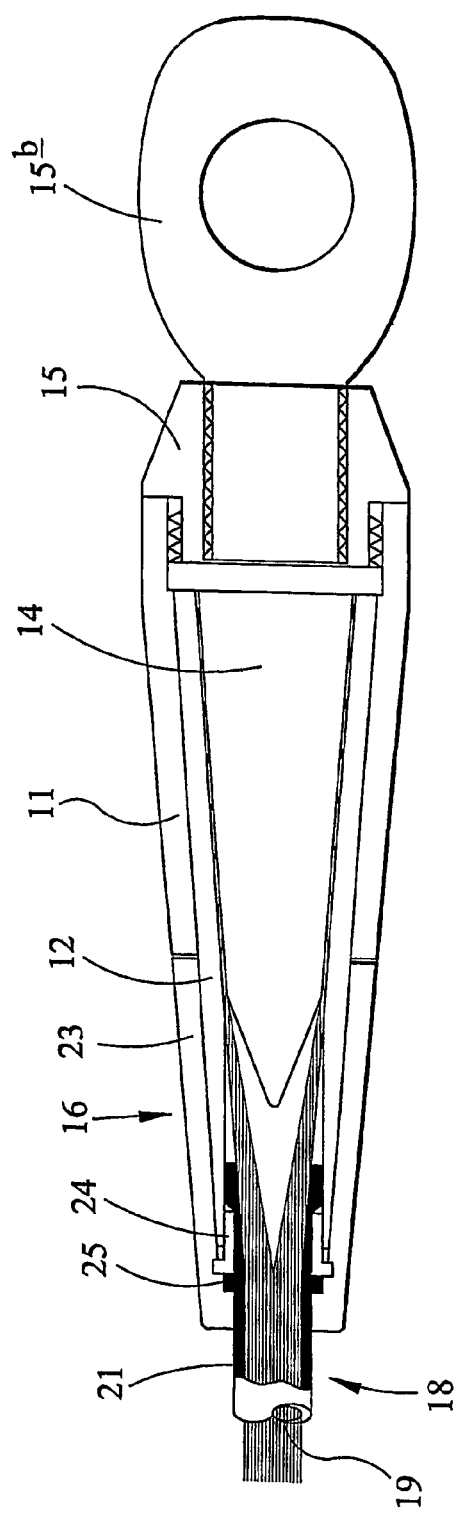

Tables 1 to 3 illustrate suitable dimensions for the body; barrel; and spike (wedge member) components respectively of terminators in accordance with examples of the present invention designed for use with Zylon™ ropes;

Tables 4 to 6 illustrate suitable dimensions for the body; barrel; and spike (wedge member) components respectively of terminators in accordance with examples of the present invention designed for use with Aramid ropes; and FIGS. 6 and 7 are sectional views of a modification of the terminator of FIGS. 2 to 5 in an exploded state and an assembled state respectively.

In Tables 1 to 6 the rope size figures denote the Nominal Breaking Load of the rope in Tonnes and the dimensions are in Millimetres.

PREFERRED MODES OF CARRYING OUT THE INVENTION

The conventional terminator shown in FIG. 1 has a hollow, elongate stainless steel body 1 of circular cross-section, formed internally with a passage 2 having a first end 2a from which the rope to be terminated extends in use, and an opposite, second end 2b. The passage 2 tapers in diameter from a maximum adjacent the end 2b, to a minimum adjacent the end 2a, and at its wider end the body 1 receives a screw threaded adaptor 2c whereby any one of a plurality of alternative fixing components can be secured to the terminator, to facilitate the connection of the terminator to a variety of different anchor points.

An elongate tapering wedge member of circular cross-section is received within the passage 2, and in use acts to trap fibres of the rope to be terminated, which are distributed around the wall of the passage 2, against the wall of the passage 2. The surface finish of the interior of the passage 2 is arranged to be smooth, such that the frictional drag between the rope fibres and the wall of the passage 2 is significantly less than the frictional drag between the fibres and the outer surface of the wedge member 3 whereby as the load on the rope increases the fibres will tend to slide relative to the wall of the passage, dragging the wedge member 3 with them, and thus increasing the clamping force which the wedge member 3 applies to the fibres against the wall of the passage 2.

Where the Fibre Failure Angle (FFA) of the rope fibres is such that the taper angle of the passage 2 can be relatively steep and where the overall diameter of the rope is relatively small, then the length of the body 1 can be correspondingly short although still sufficient to achieve the necessary frictional drag between the fibres and the wedge member. It will be recognised that as cone angle increases then the effective unit clamping force on the fibres increases but the frictional drag on the fibres does not increase and so frictional drag could become a limiting factor in length reduction with increasing cone angle. Conversely the unit clamping force decreases with decreasing cone angle so necessitating length increase to ensure sufficient total clamping force. However, as the FFA of the fibres decreases, and the overall diameter (and hence the nominal breaking load) of the rope increases then the length of body 1 which is necessary to provide the necessary clamping length (the length over which the wedge member 3 clamps the fibres against the wall of the passage 2) increases to such an extent that the weight of the steel body 1 would be prohibitive, and the manufacturing processes necessary to produce a body 1 of the necessary length, with the required smooth finish to the wall of the passage, become economically prohibitive, or in some cases impossible by current manufacturing techniques. In particular, the formation of the appropriate smooth surface finish on the interior of an extremely long tapering passage in an elongate hard steel body 1 is extremely difficult and expensive to achieve.

The forgoing disadvantages are minimised or obviated by the present invention an example of which will now be described with reference to FIGS. 2 and 3 of the accompanying drawings.

The rope terminator of FIG. 2 is of circular cross-section and comprises an outer, steel body 11 receiving an inner barrel 12 formed from a wound fibre reinforced epoxy resin material. Although winding a fibre reinforcement of the barrel is the preferred construction method it is believed that the fibre reinforcement could be provided by other methods such as the use of a three dimensional knitted fibre sock or braid or a fibre wrapping technique. However the wound fibre method is concentrated upon in the following description.

The barrel 12 is of constant wall thickness throughout its length although in some applications a varying wall thickness could be used provided a necessary minimum thickness to achieve the desired strength exists throughout the barrel length. The barrel tapers from a minimum diameter at an end 12a from which a rope to be terminated extends in use, to a maximum at its opposite end 12b. The taper angle of the internal passage 13 of the barrel 12 and its surface finish are critical but are relatively easily achieved, irrespective of the axial length of the barrel 12, by forming the barrel by winding a fibre, or a plurality of fibres, on a rotating mandrel coated with a suitable release agent, while impregnating the fibres with an epoxy resin material which, in the completed barrel 12 binds the fibres into a composite body. The fibre may be wet with epoxy resin by passing through a bath or the like of liquid resin just prior to laying the fibre on the mandrel. As an alternative the fibre could have been pre-impregnated or coated with resin in a tacky state at room temperature, the resin being heated to a flowable state as part of a curing process so as to flow into and wet the whole of the fibre matrix prior to the resin curing. The outer surface of the mandrel has the appropriate taper angle and surface finish, and it will be recognised that such a taper angle and surface finish can readily and cheaply be achieved on the exterior surface of a mandrel of circular cross-section.

As will be apparent, in use the barrel 12 must accommodate hoop or bursting stresses imposed thereon by a wedge member 14 introduced therein in use. The great majority of the strength of the barrel 12 in accepting such bursting loads is provided by the wound fibre reinforcement, and thus in order to reduce the weight of the barrel, and the wall thickness of the barrel, as much as possible it is desirable to use a reinforcing fibre which is both strong and inelastic. Of all currently available reinforcing fibres a high modulus PBO fibre, conveniently HM Zylon™ is chosen as a reasonable selection for anticipated working environments. It is to be recognised however that the use of other fibres as the fibre reinforcement of the barrel 12 is not excluded. For example, cheaper Aramid fibres could be used but this would add significantly to the wall thickness and overall weight of the terminator. Similarly certain high grades of carbon fibre could be used, however most of these would also require a greater wall thickness and would generally be more brittle possibly restricting their application or requiring an aramid coating for impact resistance. Carbon fibres also conduct electricity which in saltwater applications where they are in contact with or close proximity to differing electropositive metals such as steel and aluminium may encourage accelerated corrosion. Again this may be compensated for with suitable coating of aramid fibre wraps, but again this would add to the weight and complexity of the barrel. Other possible fibres for barrel reinforcement include "Vectran", "Technora", and S-Glass, particularly in the manufacture of terminators for fibre ropes of those materials.

Careful selection of the winding angle of the fibre, that is to say the angle which the fibre makes to the longitudinal axis of the barrel 12, is also critical to achieving the optimum strength in the barrel. Winding angles between 58° and 72° are currently believed to be the optimum winding angles for Zylon™ fibre reinforced barrels for use with both Aramid and PBO ropes of up to 80 tonne Nominal Breaking Load. Current investigations reveal that for ropes of up to 80 tonne NBL an optimum winding angle within the above range will be determined in accordance with that length of the barrel over which clamping force is applied to the rope fibres in use, the so called "effective length" of the barrel. There appears, in tests, to be a generally linear relationship between the winding angle and the "effective length" when the "effective length" increases from 0 to 100 mm, the optimum winding angle decreasing from 72° down to about 60°. However above a barrel "effective length" of 100 mm the angle appears to increase from about 60°, to stabilize at about 63° at and above an "effective length" of 160 mm. For ropes having an NBL exceeding 80 tonne, extrapolation of results for ropes of lower NBL suggests that a winding angle range 58° to 72° will still be appropriate. It is to be recognised however that the winding angles given above are suited to the terminator geometry of the present examples, and if departures are made, for example in relation to barrel cone angle then this may dictate a variation in optimum winding angle.

The nature of the epoxy resin material which bonds the fibres together is not particularly critical, provided that it has a sufficiently high glass transition point, to make sure that the epoxy matrix remains solid at the ambient temperatures which the terminator is likely to experience in use, and has a modulus much less than that of the reinforcing fibre. A suitable material is available from Vantico Polymer Specialties under their code name "Araldite® LY5052/Aradur 5052). Suitable vinyl ester resins and other similar matrix materials may be substituted for the epoxy resin.

The wedge member 14 which is introduced into the barrel 12 to clamp the fibres 19 of the rope 18 against the wall of the barrel is conveniently formed from aluminium, is of circular cross-section tapering from a maximum diameter at one end down to a rounded point at the opposite end, conveniently has a length which is 95% of the length of the barrel 12. Adjacent the pointed end of the wedge member 14 the wedge member has a region 14a of steep cone angle. This region takes no part in the clamping of fibres against the inner wall of the barrel 12 and instead serves to assist distribution of the fibres evenly around the periphery of the wedge member 14.

In operation, the wedge member is intended to have its widest diameter end flush with the end 12b of the barrel 12 when subjected to a load equivalent to the Nominal Breaking Load (NBL) of the rope. The wider end of the wedge member 14 can, for convenience, be referred to as the "rear" end and the pointed end can be referred to as the "front" end. In use, measured from the rear end of the wedge member 14, approximately 75% of the length of the wedge member is considered to be "effective length" that is to say it is considered to be length over which significant and even clamping force is applied to the rope fibres against the inner wall of the barrel 12. Thus measured from the end 12b of the barrel with which the rear end of the member 14 is intended to be flush when the rope is under its design load, the barrel has an "effective barrel length" equal to 75% of the length of the wedge member 14. The minimum required "effective lengths" of the wedge member and the barrel are determined by the taper angle of the inner surface of the barrel, the overall diameter of the fibre hank of the rope to be terminated, the thickness of the barrel, the winding angle of the fibre reinforcement, and the tensile load which the rope and terminator combination is designed to accept.

From the rear end of the wedge member 14 to the point on the wedge member where the steep tapered forward end region commences, the diameter of the tapering internal passage of the barrel 12 decreases. However the total cross sectional area of the fibres to be clamped along this region clearly remains constant, and thus in order to ensure a consistent clamping force along the "effective length" of the wedge member 14 the taper angle of the wedge member must progressively increase so that the area of the annular gap between the wedge member and the inner surface of the barrel 12 remains constant. Furthermore, in order to ensure adequate clamping of the fibres 19 between the wedge member 14 and the barrel 12, the area of the annular gap at any point along the effective length of the wedge member is, selected to be less than the total cross-sectional area of the fibres 19, so that the fibres are compressed. In practice therefore the taper angle of the wedge member 14 along its "effective length" is a compound angle, which, during manufacture of the wedge member 14 is determined conveniently at 360 equidistantly spaced points along the length of the wedge member and is then interpolated between those points.

It would be recognised that if desired the taper of the wedge member 14 could be linear, and the compound taper could be applied to the interior of the barrel 12. In practical terms however the later would be much more difficult to achieve than the former, and so it is preferred to have a linear taper in the internal passage of the barrel 12 and a compound taper along the length of the wedge member 14.

As the wall thickness of the barrel 12 is constant throughout its length the outer surface of the barrel 12 tapers at the same angle as the inner surface thereof. The surface finish on the exterior of the barrel 12 is not as critical as the internal finish, but a finish providing an adequate key for epoxy bonding to the body at the rear of the barrel and as a base for providing an aesthetically pleasing finish on the visible exterior surface will be chosen.

The hollow steel body 11 is conveniently formed by machining or forging from a blank of 17-4 ph or similar stainless steel although any alternative high tensile strength machineable material such as titanium could be substituted. The body 11 is a hollow sleeve of circular cross-section having a cylindrical region 11a at its rear end and a tapering region 11b forming the remainder of the length of the body 11. The tapering region 11b tapers at the same taper angle as the barrel 12 from a maximum diameter at its junction with the region 11a to a minimum diameter at its opposite end.

During manufacture of the terminator the preformed barrel 12 is inserted through the body 11 from the end region 11a thereof until the outer surface of the barrel 12 seats firmly against the inner surface of the body region 11b. An epoxy resin material (conveniently SPABOND® 735) exhibiting high shear strength over the ambient temperature range in which the terminator is to be used, is first applied to the inner tapering wall of the body 11 avoiding the screw thread thereof and then the barrel 12 is pushed firmly into the body 11 to ensure that the outer tapered surface of the barrel 12 seats firmly against the inner tapered surface of the body 11 with epoxy resin therebetween. The resin is then allowed or caused to cure. It will be recognised that the tapering region 11b of the body 11 supports the corresponding region of the barrel 12 against bursting (hoop) loads imposed thereon in use. The length of the region 11b of the body with an included cone angle of 7.6 degrees is chosen to be a minimum of 60% of the "effective barrel length" although the 60% factor may be varied with terminators offering a different geometry. The thickness of the tapering body section is calculated to withstand the bursting or hoop stresses applied by the barrel in use.

The internal taper angle of the barrel 12 is selected in order to ensure that the rope fibres with which the terminator is to be utilised do not bend through an angle exceeding their FFA at the point where they issue from the barrel 12 and become the main length of the rope. Clearly therefore desirably for optimum performance the included angle of the tapering passage of the barrel 12 should not exceed two times the FFA of the fibres of the rope with which the terminator will be utilised. Where the terminator is to be used with ropes formed from Aramid fibres then the barrel internal taper angle should not exceed 7° and for practical considerations will not be less than 2.5°. The preferred taper angle for Aramid fibre ropes is 3.8° giving a preferred included angle for the tapering passage of the barrel 12 as 7.6°. Generally, PBO fibres, for example Zylon™ fibres, have a lower FFA than Aramid fibres. Thus a terminator suitable for use with Zylon™ fibres would have a maximum taper angle of 4.5° with a practically determined minimum taper angle of 2°. A preferred taper angle would be 3.8° giving an included angle for the tapering passage of the barrel 12 of 7.6°. In one practical embodiment, a terminator of the kind shown in FIG. 2 was designed to be suitable for use with both Aramid fibre ropes and PBO fibre ropes, and had a barrel taper angle of 3.8°, giving an included angle of 7.6° for the rope receiving passage of the barrel.

In order to ensure that the frictional drag between the fibres and the wall of the barrel 12 is significantly less than the frictional drag between the fibres and the outer surface of the wedge member 14 in use, the inner surface of the barrel 12 is maintained as smooth as possible, and the outer surface of the wedge member 14, at least along its "effective length" is roughened by shot or sand blasting or the like. It will be recognised that it is crucial that any tendency for movement within the barrel when the rope is under its design load is movement of the wedge member and fibres together deeper into the barrel so increasing the clamping force imposed on the fibres. Should the fibres move relative to the wedge member clamping force on the fibres may be lost and the terminator/rope combination may fail.

Figure 4:
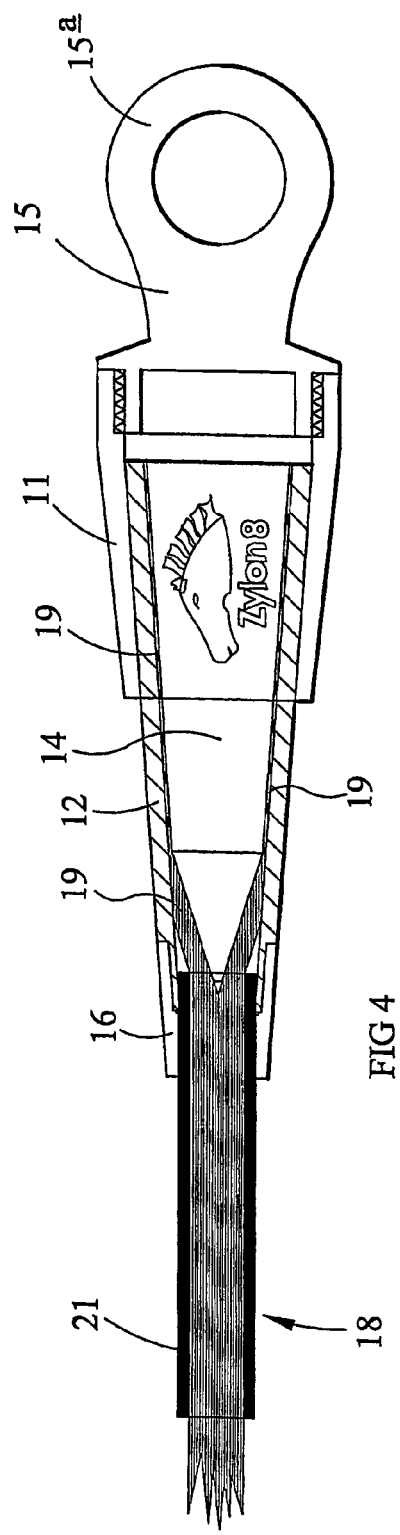
FIG. 4 is a diagrammatic side view of a fully assembled terminator.
Figure 5:
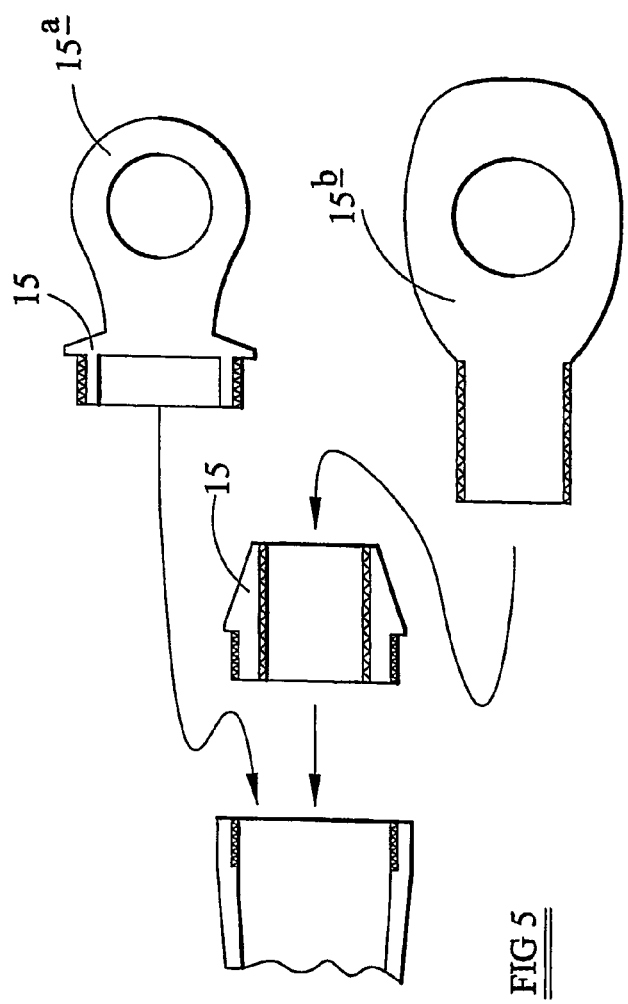
FIG. 5 is a diagrammatic view of two alternative fixing component arrangements.

The rearmost end region 11a of the body 11 receives, as a screw fit, an adaptor 15 formed from stainless steel, and shaped to receive, also as a screw fit, any one of a number of different fixing components 15b (FIG. 5) designed to mate with a range of different anchor points. Alternatively an integrated end fitting, incorporating customised dimensions and non-standard thread to match the body with the final end fixture, could be attached. In either case the body together with either the adapter or the integrated fitting have non-standard threads to ensure 'standard' fittings are not attached directly to the body. The screw thread inside the adapter is designed to attach to standard 'end fixtures' or 'anchor points' to the terminator and is load rated accordingly. The strength of the threaded connection of the fixing component 15b to the adaptor 15 and the strength of the screw threaded connection of the adaptor 15 to the body 11 is sufficient to exceed the maximum design load to be applied to the rope terminated by the terminator. The bond between the body 11 and the barrel 12, achieved by the mating taper forms and the epoxy resin provided at their interface, is determined by design and experimentation to 'fail' at 70% +/−10% of maximum design load. Thereafter the bond fails allowing the barrel 12 to be extruded slightly from the body 11 providing a clear visual signal (increased exposed barrel surface) that the 'stay' has been loaded significantly above its designed working load. The terminator will continue to hold the load of the rope up to its maximum design load with progressive extrusion of the barrel 12 from the body 11 with increasing load. This mechanical overload indication warns the user that the load on the stay should be reduced and that replacement of the stay should be considered. In FIG. 4 the adaptor 15 is integral with the fixing component which is in the form of an eye ring 15a.

Figure 3:
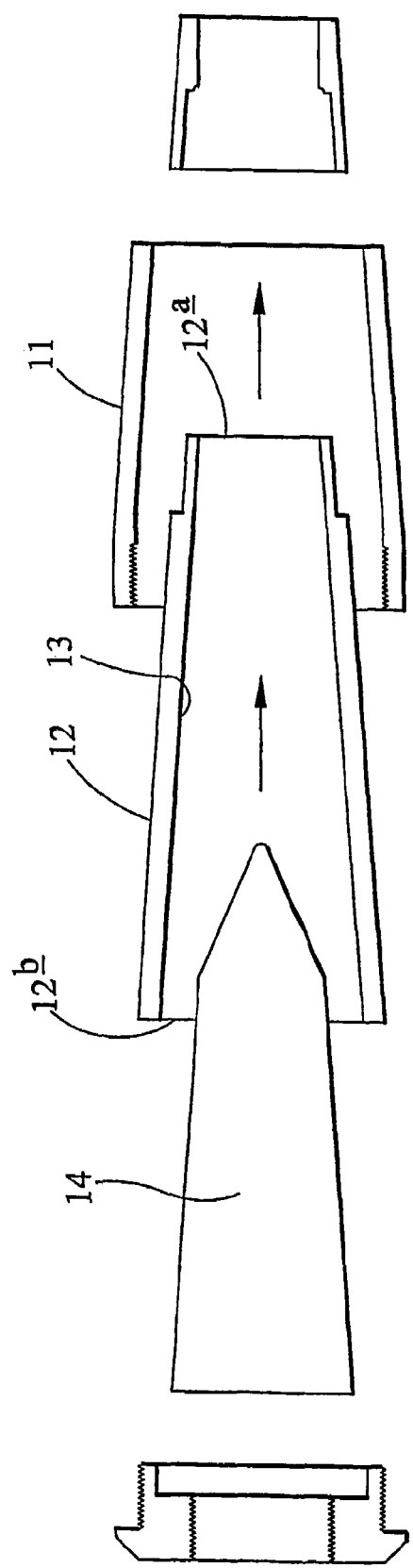
FIG. 3 is an exploded cross sectional view of the terminator of FIG. 2.

It can be seen in FIGS. 2 and 3 that the front end of the barrel 12 is provided with a tapering nosepiece 16. The nosepiece 16 is a moulded synthetic resin component which does not have any significant effect on the termination of the rope, but serves to provide a decorative end to the barrel 12, and to assist in sealing the interface of the terminator and the rope. If desired an 'O'-ring seal 17 can be trapped between the nosepiece 16 and the end of the barrel 12 to grip the rope and so facilitate sealing. Normally the rope 18 will be made up of continuous parallel fibres 19 within a thermoplastic sheath 21. The thermoplastic sheath 21 will extend into the nosepiece 16 and coact with the seal 17, but will terminate thereafter so that the fibres 19 can be fanned out around the steeply tapering front end region of the wedge member 14 so as to be evenly distributed around the wedge member 14.

Although the invention is particularly concerned with parallel core ropes it is to be understood that the terminator could be used with ropes where the fibres, within the main run of the rope, are wound or braided together, provided that at the end of the rope which enters the terminator the fibres of the rope can be "combed-out" to extend generally rectilinearly and parallel to one another between the wedge member 14 and the inner wall of the barrel 12.

In the examples described above the wedge member 14 has a region which has been referred to as the 'effective length' and which has a composite taper. The length of this region is 75% of the overall length df the wedge member. The remaining 25% of the wedge member is defined by a front end region 14a which tapers steeply. It will be recognised that there is a relatively sharp transition between the forward end of the 'effective length' region and the front end region of the wedge member. In a modification of the wedge member described above a transition zone, integral with the 'effective length' region and the front end region 14a is provided between those regions. The length of the 'effective length' region of the wedge member is reduced to 73% of the total length and the transition zone is arranged to have a length which is approximately 10% of the length of the 'effective length' region, and thus is approximately 7.3% of the overall length of the wedge member. The steeply tapered front end region 14a of the wedge member thus will occupy the remaining 19.7% of the total wedge member length.

Within the transition zone the diameter of the wedge member tapers progressively from the smallest diameter of the 'effective length' region to the maximum diameter of the front end region 14a. This is achieved using an exponential function to give a smooth, and progressive transition between the front end region 14a and the 'effective length' region which permits a progressive 'easing-off' of the clamping force applied to the fibres 19 of the rope 18, by comparison with the sudden removal of clamping pressure at the interface of the two regions in the wedge member described above.

The benefits of providing a transition zone in the tapering wedge member 14 are, the elimination, or significant reduction, of the concentration of stress in the fibres at the end of the 'effective length' region of the wedge member; elimination of a sudden change in the bending angle of the fibres; and, reduction in the differential stress in the barrel of the terminator by increasing that stress progressively over a small proportion of the barrel length rather than going from essentially zero to full loading instantaneously as was the case with the wedge member not employing the transition zone. These benefits translate into a reduction in the possibility of fibre breakage at the high stress points and the ability of the barrel to distribute forces acting thereon over a larger area. Such a modification to the above described arrangement appears to be particularly beneficial in use with PBO cored ropes.

FIGS. 6 and 7 illustrate a modification of the terminator described above with reference to FIGS. 2 to 5. Although structurally there are some differences between the terminator of FIGS. 6 and 7 and the previously described terminator, the principles of operation are identical. Components in the terminator of FIGS. 6 and 7 carry the same reference numerals as equivalent components in the terminator of FIGS. 2 to 5. Again the terminator includes a hollow metal body 11, which, in the example of FIGS. 6 and 7, is formed from aerospace grade titanium, but which also could be formed from aerospace grade stainless steel (17-4 ph) or from aluminium (7075) which in practice would need hard anodising. Within the body is an inner barrel 12 formed, as described above, from a wound fibre reinforced epoxy resin material. Within the inner tapering passage 13 of the barrel 12 is a tapering wedge member 14 (or "spike"), and in this example made from an aerospace grade aluminium or similar high compressive strength material, conveniently 2014-T FIG. 6 grade aluminium having a compressive strength of 470 MPa. An adaptor 15, in this example formed from the same material as the body 11, is in screw threaded engagement with one end of the body 11 and receives any one of a range of different fixing components 15b as described above. Also as described above, the adaptor 15 could be integrally formed with a predetermined end fitting. In use, the barrel 12 protrudes beyond the end of the body 11 remote from the adaptor 15 and has associated therewith a nose piece 16.

The nose piece 16 differs significantly from the nose piece of the example described above with reference to FIGS. 2 to 5 in that in the example of FIGS. 6 and 7 the nose piece 16 includes an elongate hollow tapering moulded synthetic resin cover of sufficient length to accommodate substantially the whole of the length of the barrel 12 which protrudes from the body 11 in use. Additionally, the nose piece 16 includes a moulded synthetic resin collar 24 having the form of an elongate cylindrical sleeve with an outwardly protruding flange 24a at one end thereof, and, the nose piece 16 still further includes a rubber 'O' ring seal 25. As is apparent from FIGS. 6 and 7, in the assembled terminator the rope 18 including its outer sheath 21, extends through the narrower end of the cover 23, through the 'O' ring seal 25 and through the collar 24. The sleeve of the collar 24 extends into the end region of the barrel 12 so that in effect the end region of the barrel 12 lies between the outer face of the sleeve of the collar 24 and the inner face of the cover 23. The flange 24a of the collar 24 traps the 'O' ring seal 25 against an internal shoulder of the cover 23 so that the 'O' ring seal 25 grips the sheath 21 of the rope 18 and bears against the cover 23 to seal the inter face of the sheath 21 and the cover 23 against ingress of dirt and moisture in use. The significance of the use of the collar 24 in conjunction with the cover 23 and barrel 12 will become clearer hereinafter when the assembly sequence of the terminator is described.

The barrel 12 functions, in conjunction with the wedge member 14, exactly as described above to lock the fibres 19 of the rope 18 in the terminator. However, it will be noted that the passage 13 of the barrel 12 of FIGS. 6 and 7 is two distinct parts. The first part 13a extends into the barrel from the end of the barrel which is presented to the adaptor 15 in use, and extends along the whole of the "effective" length of the barrel as described above with reference to FIGS. 2 to 5. In practice the first part 13a of the passage 13 terminates at a point along the length of the barrel which is about 3% of the barrel length greater than the "effective" length defined above. The taper angle of the first part 13a of the passage 13 is 3.8° as described above, giving an included angle for the first part 13a of the passage of the barrel of 7.6°. However, the remainder of the passage 13, forming the second part 13b of the passage, has a much reduced taper angle, conveniently about 0.7°. It will be recognised that the portion of the barrel 12 which contains the second part 13b of the passage 13 is external to the body 11 in use, and is not subjected to the expansion loads imposed on the assembly by the wedge member 14 when clamping the rope fibres in place.

The external taper angle of the barrel 12 remains at 3.8° throughout the whole length of the barrel, and so the wall thickness of the barrel progressively reduces along the length of the region of the barrel containing the second part of the passage 13 so that the wall thickness of the barrel 12 is at a minimum at the end of the barrel 12 remote from the adaptor 15. This progressive thinning of the wall of the barrel permits the free end of the barrel to be received between the sleeve of the collar 24 and the inner surface of the cover 23 of the nose piece 16 in use.

As mentioned above the body 11 is conveniently formed in this example from titanium. In the embodiments described above with reference to FIGS. 2 to 5 the wall thickness of the body 11 is substantially constant throughout the tapering length of the body 11. Similarly, in the example of FIGS. 6 and 7 the external and internal taper angles of the tapering part of the body 11 are such that the wall thickness of the body 11 is substantially constant throughout the tapering length of the body.

Structurally the wedge member 14 does not differ significantly from the one described above, and it should be noted that the "transition zone" described above in relation to the wedge 14 will preferably also be used in the wedge member of FIGS. 6 and 7. It will be recalled that in the description of the wedge member 14 of FIGS. 2 to 5 it was stated that the surface of the wedge member is roughened to ensure that the frictional grip between the wedge member and the rope fibres is greater than the frictional grip between the rope fibres and the wall of the barrel 12. This requirement is still true of the wedge member 14 of FIGS. 6 and 7, but only the rear two-thirds of the length of the wedge member 14 of FIGS. 6 and 7 is subjected to roughening. The narrower diameter, front end of the wedge member, including the transition zone, is polished rather than roughened. It will be recognised therefore that in the area between the roughened surface of the wedge 14 and the transition zone will be a point where the fibres begin to 'slip' and extend across the surface of the spike when load is applied. The purpose of polishing this region of the wedge member is to minimise the potential for abrasion of the fibres of the rope against the wedge member between this 'slip' point and the front of the spike. It will be recalled that when the wedge member is inserted into the fibre bundle of the rope and traps the fibres against the barrel 12 the fibres become "attached" to the spike at the point where the surface roughening of the wedge member starts. Consequently, in use, when a varying load is applied to the rope and the terminator, only the region of the fibres passing over the polished region of the wedge member can experience any movement relative to the wedge member (the remaining length of the fibres being trapped firmly between the wedge member and the barrel 12). Thus it is only the region of the fibres passing over the polished portion of the wedge member 14 which could be at risk of abrasion as a result of such movement, and by providing a polished surface the potential for damage through abrasion is minimised.

When assembling the terminator to a rope 18 the interior of the body 11 is first coated with an epoxy resin material, conveniently the high shear strength epoxy resin material described above with reference to FIGS. 2 to 5. The preformed barrel 12 is then inserted into the body 11, the procedural step of coating the interior of the body with resin, rather than coating the exterior of the barrel, ensuring that the screw threaded region of the body 11, which will ultimately receive the adaptor 15, is not contaminated with resin.

Using an appropriate insert as a tool, the barrel is pulled firmly into the body whilst rotating it in order to ensure an even distribution of the epoxy resin between the barrel and the body.

Next the adaptor 15 is likely screwed into the body 11 bearing against the end of the barrel, and pressing the barrel firmly into the body to ensure that the barrel is tightly seated in the body.

The collar 24 is positioned in the cover 23 of the nose piece 16, and the region of the barrel 12 protruding from the narrow end of the body 11 is then coated with the same epoxy resin, the assembled nose piece 16 is pressed into place over the protruding part of the barrel 12 and is held in place with an external clamp. Any excess epoxy resin displaced from the assembly of body, barrel and nose piece is wiped away, and the assembly is then treated to cure the epoxy resin in accordance with the resin manufacturers instructions. Thereafter the seal ring 25 is inserted through the open end of the cover 23 to seat within the annular recess between the end of the cover 23 and the flange 24a of the collar 24.

The adaptor 15 is then removed and the rope 18 is inserted through the open end of the cover 23 of the nose piece 16 and threaded through the 'O' ring 25, the collar 24, and the barrel 12 to protrude through the open wider end of the body 11. It will be recognised that during insertion of the rope the cut end of the rope does not come into contact with an end surface of the barrel 12. The free end region of the barrel 12 is received between the sleeve of the collar 24 and the cover 23, and thus is not exposed to the rope 18 during insertion of the rope. This arrangement ensures that there is no possibility that any loose fibres of the construction of the barrel which may be present at the machined end of the barrel, can be captured by the rope as the rope is inserted. It will be recognised that if fibres could become entangled with the rope then there is a risk that they would be pulled out of the epoxy resin matrix of the barrel thus damaging the barrel and prejudicing its structural integrity. Even a few fibres caught in this manner could result in damaging delamination of the barrel because the fibres of the barrel are in a crisscross pattern and pulling even a few fibres from the matrix could displace many more fibres resulting in substantial damage and adverse effects on the interior surface of the barrel and the structural strength of the barrel. It will be recalled that the interior surface finish of the barrel must be smooth in order to ensure that the frictional grip between rope fibres and wedge member 14 exceeds the frictional grip between the rope fibres and the wall of the barrel.

The length of the rope protruding from the wider end of the body 11 is cut, using a cable stripper or a hot blunt blade, to remove a length of the outer sheath 21 equal to 110% of the overall length of the wedge member 14 ensuring that no damage to the rope fibres occurs. The removal of a length of sheath 10% greater than the length of the wedge member ensures that the sheath 21 terminates within the barrel 12, but at a point beyond the apex of the wedge member 14 permitting a gradual spread of rope fibres 19 beyond the cut end of the sheath 21 to allow the fibres to pass around the apical end region of the wedge member 14.

Following removal of the appropriate length of sheath 21 the exposed rope fibres are brushed, conveniently using a small brass bristle brush, to achieve an even radial distribution of fibres around the axis of the rope. The apical end of the wedge member 14 is then introduced into the fibre bundle and the rope fibres are distributed as evenly as possible around the wedge member 14. So far as it is possible to do so fibre crossovers along the length of the wedge member 14 are avoided, and the wedge member is inserted into the bundle of fibres until the wider, rear end of the wedge member 14 is aligned with the cut end of the fibres 19.

Holding the fibres and wedge member in position relative to one another, the assembly of body 11, barrel 12 and nose piece 16 is slid along the rope so that the first part 13a of the passage 13 of the barrel 12 receives the wedge member 14 and the array of rope fibres around the wedge member. The length of the rope protruding from the nose piece 16 is clamped in any convenient manner and tension is applied to the body 11 to pull the assembly of body 11 barrel 12 and nose piece 16 along the length of the wedge member 14 so that the rope fibres arrayed around the wedge member 14 become trapped between the wedge member 14 and the wall of the first part 13a of the passage 13 of the barrel.

Next the adaptor 15 is screwed into the open end of the body 11 and the process is repeated with a terminator at the opposite end of the rope, and the completed rope assembly is then proof loaded to 50% of its nominal breaking load. At this stage if desired the adaptors 15 can be removed to permit the insertion of packing pieces between the end of the wedge member 14 and the respective adaptor 15, the packing pieces ensuring that there can be no rearward movement of the wedge members 14 even if the rope assembly is subjected to extreme sudden shock loadings in use.

It will be recognised that in the assembly disclosed with reference to FIGS. 6 and 7 the 'O' ring seal 25 provides a primary seal at the interface of the rope and the nose piece 16. However, the end of the sheath 21 of the rope within the nose piece 16 also forms a secondary seal against the interior of the barrel 12, since in use, when the rope is tensioned, the divergence of the fibres 19 to pass around the wedge member 14 displaces the sheath 18 resiliently outwardly to press against the interior of the barrel 12 and the inner axial end of the collar 24. Moreover, desirably the barrel and the nose piece 16 are so dimensioned that the barrel 12 terminates about 1 mm short of the flange 24a of the collar 24 and there is a small annular clearance between the outer face of the end of the barrel and the inner face of the cover 23. These clearances provide tolerances within which small movements of the barrel relative to the cover can take place prior to curing, and also provide clearances into which excess epoxy resin can flow when the cover 16 is adhesively secured to the barrel 12. The cover 23 substantially completely encloses the region of the barrel 12 protruding from the body 11. While this arrangement is provided primarily for cosmetic reasons it should be recognised that the cover can provide a UV shield protecting the material of the barrel against degradation arising from UV exposure in use. Conveniently a spiral groove is provided on the interior surface of the cover 23 to provide a key for the epoxy resin when the cover is glued in place on the barrel.

It is mentioned above that the forward end of the wedge member 14 is polished to minimise the risk of abrasion damage to the rope fibres 19. It will be recognised also that in their length between the wedge member 14 and the interior of the cut end of the sheath 21, the fibres 19 do not contact the interior surface of the barrel by virtue of the clearance provided by the decreased taper angle of the interior of the barrel in the second portion 13b of the passage 13.

It will be recognised that if an Aramid, or PBO fibre rope was utilised in conjunction with a metal barrel of the kind known in the prior art then should there by relative movement between the barrel and the fibres, for example at the point where the fibres enter between the wedge member and the barrel, then the harder material, the metal barrel, would wear away the softer material of the rope fibres. In use therefore there would be an increasing risk of failure of the rope within the terminator. However, in accordance with the present invention the barrel is formed from Aramid or PBO fibre reinforced plastics material (epoxy resin) having a mirror-like interior surface. The highly polished interior surface of the barrel minimising the risk that relative movement between rope fibres and the barrel will produce any abrasion. However, if abrasion does occur then the weaker material, the thin plastics layer overlying the barrel reinforcement fibres, will be abraded away, and thereafter Aramid or PBO rope fibres will be in contact with Aramid or PBO reinforcing fibres of the barrel. Thus any abrasion taking place thereafter will be at a microscopic level where the fibre materials are extremely smooth, and thus exhibit a very low coefficient of friction. Moreover, the fibre materials would be of very similar hardness, and so the risk of abrasion damage to the rope fibres or the structure of the barrel is very small. In the preferred embodiment of course the barrel reinforcement fibres are Zylon and the rope fibres are also Zylon thus greatly reducing the abrasion potential and leading to greater long term fatigue performance of the whole assembly.

In operation when the rope assembly is subjected to significant load a point will be reached at which the barrel can start to extrude from the body under load. Using the design illustrated in FIGS. 6 and 7 extrusion of the barrel relative to the body would commence at approximately 65% to 75% of the Nominal Breaking Load of the assembly. The point at which the barrel 12 begins to extrude from the body 11 is determined by a combination of the length of the body/barrel interface and secondarily by the angle of the interface and the thickness of the body. Such movement of the barrel relative to the body can readily be observed by inspection of the terminators after such loading, and provides mechanical overload indicator for giving an early indication that the rope assembly has been utilised at load values approaching its Nominal Breaking Load. In normal use the recommendation will be that the rope assembly should be used at a working load which does not exceed 40% of the Nominal Breaking Load. Consequently a user seeing that extrusion of the or each barrel has occurred will recognise that the rope assembly has been used significantly in excess of its intended working load and that replacement of stay (rope and terminator assembly) may be advisable for safety.

With the exception of specific dimensions referred to in the foregoing description relating to FIGS. 6 and 7 it can be assumed that the dimensional characteristics of the components of the terminator are reasonably in accordance with Tables 1 to 6 appended hereto. Variation in the mating length M in Table 1 will occur with the use of a different material for construction of the body and/or with a different combination of body thickness, mating length and geometry (included barrel angle) to achieve a different extrusion point for the barrel.

The invention claimed is:

1. A rope terminator comprising, an elongate hollow barrel formed from a fiber reinforced synthetic resin material, the barrel having therein a rope receiving passage, and said passage having a first end region from which the rope to be terminated extends in use, and an opposite, second end region, the passage tapering in internal diameter from a minimum at said first end region to a maximum at said second end region, a tapering wedge member for insertion into said passage of the barrel to trap fibers of the rope between the outer tapering surface of the wedge member and the inner tapering surface of said passage, the wall of said passage and the surface of the said wedge member being such that the frictional drag of the rope fibers on the wall of said passage is less than the frictional drag of the fibers on the surface of the wedge member when the wedge member traps fibers against the wall of the passage, said barrel having an outer surface region overlying a wider end region of said passage, said outer surface region of said barrel tapering in diameter in the same direction as the direction of taper of said region of said passage which it overlies, and, the terminator further including a hollow outer body member having therein a tapering passage within which said outer tapering surface region of said barrel is received, whereby said outer body member encases said outer surface region of said barrel and supports that region of the barrel against bursting loads imposed thereon by the action of said wedge member trapping rope fibers against the wall of said wider end region of said passage, and provides a means of attaching the terminated rope to an anchor point.

2. A terminator as claimed in claim 1 wherein said outer body member is formed from steel or similar high tensile strength machineable material.

3. A terminator as claimed in claim 1 wherein said outer body member is formed from titanium.

4. A terminator as claimed in claim 1 wherein said outer body member is arranged to releasably receive any one of a plurality of alternative anchorage components.

5. A terminator as claimed in claim 1 wherein the fiber reinforcement of the material of the barrel is provided by one or more p-phenylylene-2'6 -benzobisoxazole(PBO) fibers wound about the axis of the barrel.

6. A terminator as claimed in claim 1 wherein the fiber reinforcement of the material of the barrel is provided by one or more Aramid fibers would about the axis of the barrel.

7. A terminator as claimed in claim 1 wherein the taper angle of the wedge member is such that throughout the length of the wedge member the area of the annulus defined between the outer surface of the wedge member and the inner surface of the passage within which rope fibers are trapped in use is constant.

8. A terminator as claimed in claim 1 wherein the end region of the barrel through which the rope enters the barrel in use is lined by a sleeve member which spaces the rope from the end of the barrel.

9. A terminator as claimed in claim 1 wherein a separately formed cover overlies the length of said barrel which protrudes from said body .

10. A terminator as claimed in claim 1 characterized by incorporating mechanical overload indicator means.

11. A terminator as claimed in claim 10 wherein said overload indicator means is the extrusion of the barrel from the body when the loading applied in use to an assembly of terminator and rope exceeds a predetermined value.

12. A terminator as claimed in claim 1 wherein at last two axially discrete surface regions of the exterior of said wedge member have different coefficient of friction.

13. A terminator as claimed in claim 1 wherein the material of the fiber reinforcement of the barrel is the same as or similar to the fiber material of the rope with which the terminator is to be used.

14. A terminator as claimed in claim 1 wherein the barrel is adhesively bonded to the inner surface of the body.

* * * * *